UNITED STATES PATENT OFFICE.

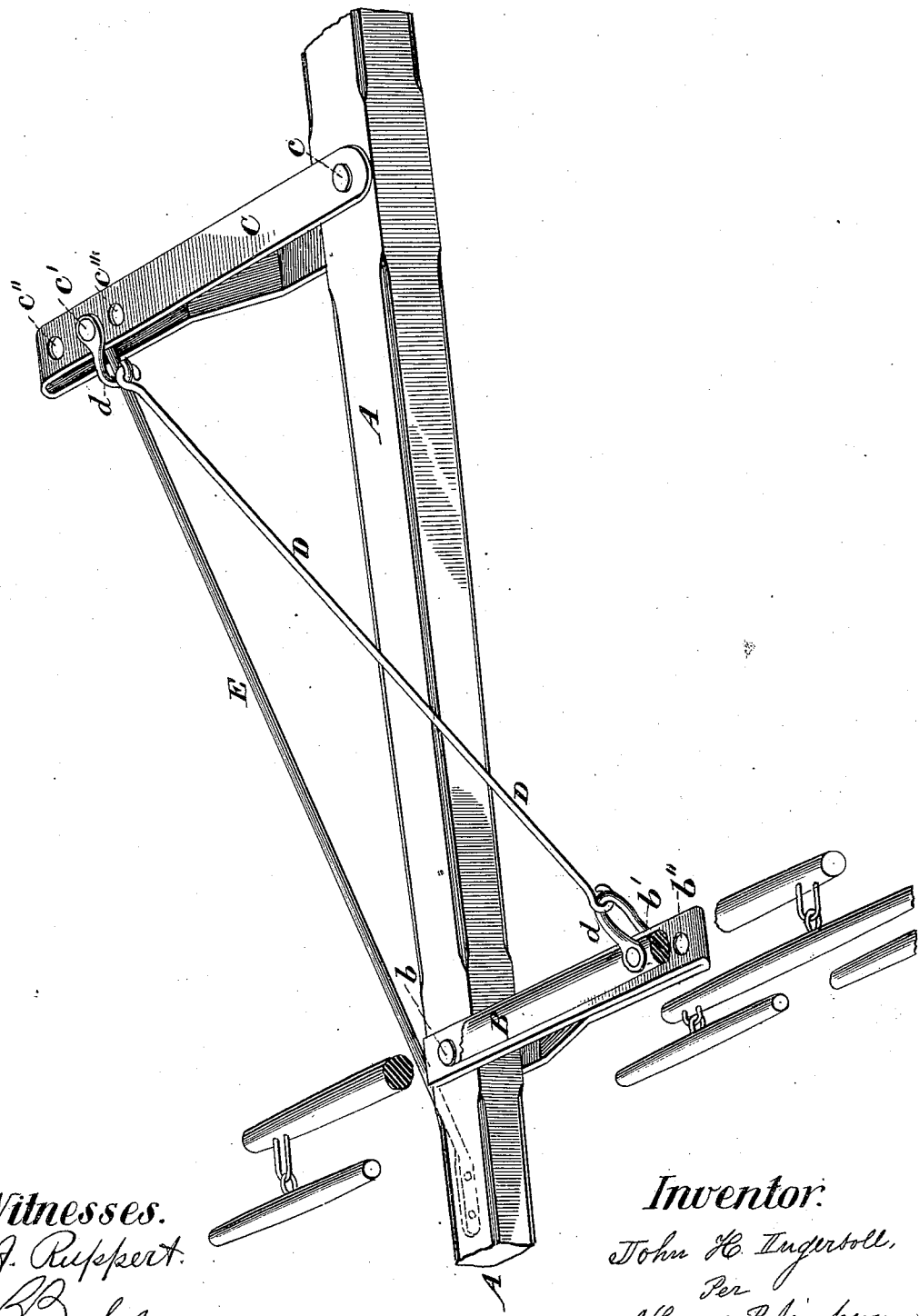

JOHN H. INGERSOLL, OF EDGEWOOD, IOWA.

DRAFT-EQUALIZER.

SPECIFICATION forming part of Letters Patent No. 332,805, dated December 22, 1885.

Application filed August 29, 1885. Serial No. 175,677. (No model.)

*To all whom it may concern:*

Be it known that I, JOHN H. INGERSOLL, of Edgewood, county of Clayton, Iowa, have invented a Draft-Equalizer for Harvesters, of which the following is a specification.

The drawing is a perspective view, in which A represents the harvester-pole, which has a cutting apparatus on the right side thereof, and on the same side a pivoted bar, C. On the opposite side and farther to the front is a pivoted bar, B, secured by bolt $b$ to the pole. On this bar the evener and the clevis $d$ are bolted at $b'$ or $b^2$, while on the bar C is pivoted, at $c'$, $c''$, or $c'''$, the clevis $d'$, which is connected by a diagonal eye-rod, D, with the clevis $d$. The rod E is held to bar C by the bolt which holds clevis $d'$, and its forward end is made fast to pole A in front of the bar B. I use the rod E to brace the pole against its tendency to press laterally toward the grain or mechanism side of the harvester. By adjusting the clevises and their bolts to the holes $b'$ $b''$ $c'$ $c''$ $c'''$ the obliquity of the rod D may be varied.

Having thus described all that is necessary to a full understanding of my invention, what I claim as new, and desire to protect by Letters Patent, is—

The brace-rod E, combined with the pivoted bars B C, arranged on opposite sides of the tongue A and connected by a diagonal rod, D, substantially as shown and described.

JOHN H. INGERSOLL.

Witnesses:
I. M. INGERSOLL,
G. W. HOLLENBECK.